(No Model.)
H. K. OLMSTED.
TWO WHEELED VEHICLE.
No. 376,962. Patented Jan. 24, 1888.
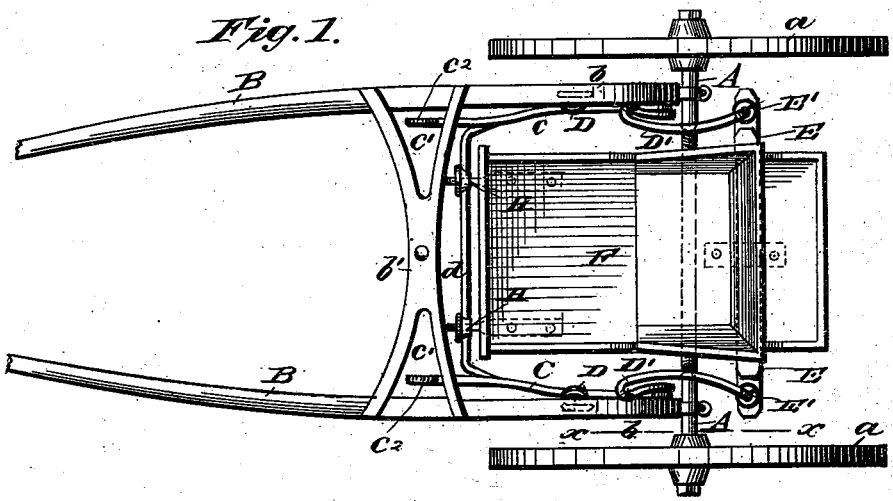
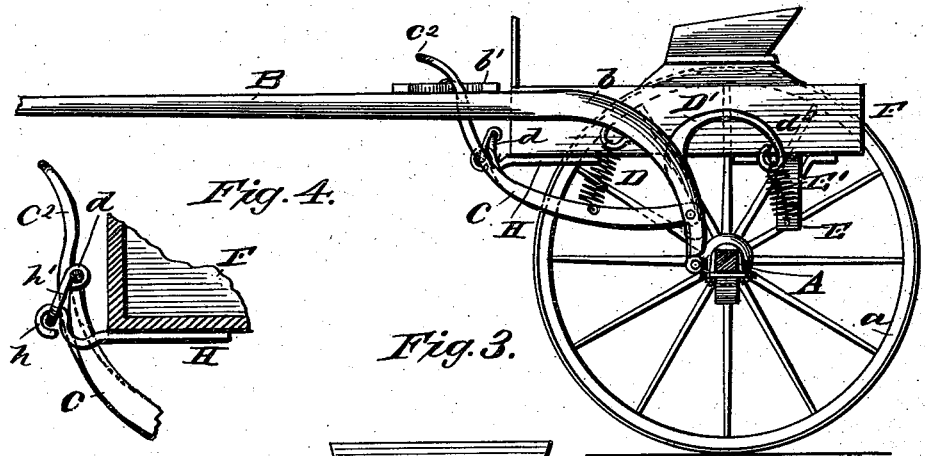
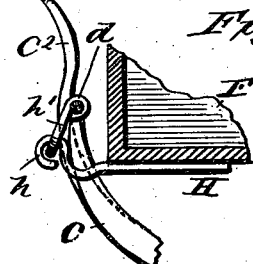
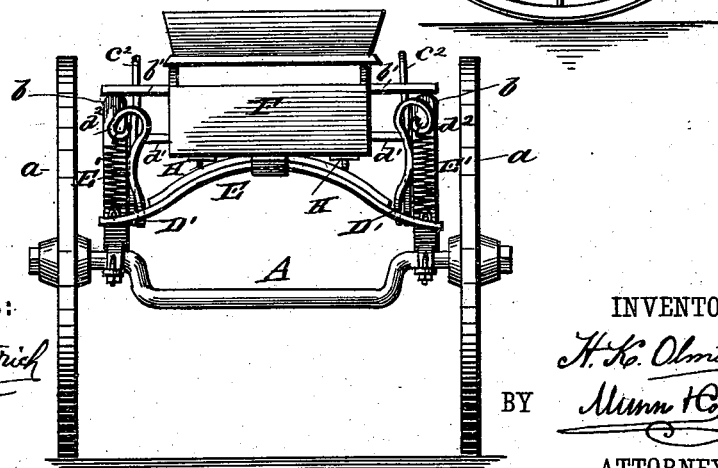
WITNESSES:
Phil. C. Dietrich
C. Sedgwick
INVENTOR:
H. K. Olmsted
BY Munn & Co.
ATTORNEYS.

UNITED STATES PATENT OFFICE.

HENRY K. OLMSTED, OF VICTORIA, ILLINOIS.

TWO-WHEELED VEHICLE.

SPECIFICATION forming part of Letters Patent No. 376,962, dated January 24, 1888.

Application filed October 19, 1887. Serial No. 252,830. (No model.)

*To all whom it may concern:*

Be it known that I, HENRY KIMBALL OLMSTED, of Victoria, in the county of Knox and State of Illinois, have invented a new and Improved Vehicle, of which the following is a full, clear, and exact description.

My invention relates to an improvement in vehicles, especially vehicles having but two wheels, and has for its object to provide a means whereby the seat will be free from horse-motion, and wherein, should one wheel run over or strike an obstruction, the tendency to throw the rider sidewise will to a great extent be overcome.

The invention consists in the construction and combination of the several parts, as will be hereinafter fully set forth, and pointed out in the claims.

Reference is to be had to the accompanying drawings, forming a part of this specification, in which similar letters of reference indicate corresponding parts in all the figures.

Figure 1 is a plan view of the improved vehicle. Fig. 2 is a sectional side elevation on line $x\ x$ of Fig. 1. Fig. 3 is a rear elevation of the vehicle; and Fig. 4 is a detail view, partly in section.

In carrying out the invention I shall describe it as attached to a two-wheeled vehicle, in which the horse-motion is felt to the greatest degree; but I do not confine myself to this particular class of vehicle, as the attachment may be made in whole or in part to other styles without departing from the spirit of the invention.

A represents the axle, $a$ the wheels, and B the shafts, the thills of which are downwardly and rearwardly curved and rigidly clipped to the axle, and the said shafts are connected a distance from the rear ends by a substantially X-shaped bar, $b'$, adapted to serve as a support for the whiffletree.

In the forward face of each thill, above the axle, one end of a curved arm, C, is pivoted, the other end of which is carried upward through the end spaces, C', formed by the bifurcations of the bar $b'$, and made to project unattached above said front bar, as shown at $C^2$.

The curve of the thills and that of the arms C are directly opposite, and the said thills and opposing arms are connected near the rear by a spiral or coil spring, D, the tension of the spring being such as to normally keep the upper ends, $C^2$, of the arms in substantial contact with the rear members of the bifurcated bar $b'$. The arms C are connected above their centers and below the bifurcated bar $b'$ by a horizontal bar, $d$, which may be termed the "body-bar," said arms and bar forming a frame which carries the forward end of the body.

At the rear end of each of the thills a bracket, D', is secured, which bracket consists of a round or other suitably-shaped iron or steel bar curved outwardly and rearwardly at the upper end over the axle, which end terminates in an eye, $d^2$.

The body F, which may be of any desired shape or style, is provided near the rear with an attached transverse semi-elliptic spring, E, the ends of which spring E are connected with the outer ends of the brackets D' by coil or spiral springs E', one end of said springs E' being attached to the eye $d^2$ of the brackets and the other end, by means of an eye or other equivalent device, to the ends of the semi-elliptic spring E.

Upon the bottom of the body F, near each side, longitudinal rods or bars H are rigidly secured, which bars project beyond the body at the front, terminating in a more or less open eye, $h$, adapted to engage a link, $h'$, suspended from the body-bar, or the body-bar itself, as found in practice most desirable.

It will be observed that the pivoted arms permit the entire weight of the rider to rest upon the springs, and inasmuch as there is no rigid attachment between the brackets D' and the body, or the arms C and the axle or shafts, the horse-motion is not communicated to the rider, and should one wheel ride over an obstruction, instead of the lateral motion experienced in vehicles when the wheel descends, the springs will communicate an easy and pleasant vertical motion, whereby the tendency to throw the rider to one side is overcome.

Having thus fully described my invention, I claim as new and desire to secure by Letters Patent—

1. In a vehicle, the combination, with the shafts, of a body provided with a transverse semi-elliptic spring and spiral springs connecting the ends of said transverse spring with the shafts, substantially as shown and described.

2. In a vehicle, the combination, with the shafts and a spring-actuated frame pivoted in said shafts, of a body suspended from said frame at the forward end and resting upon springs at its rear end, substantially as and for the purpose herein set forth.

3. In a vehicle, the combination, with the shafts and a spring-actuated frame pivoted in said shafts, of a body suspended from said frame at its forward end, a semi-elliptic spring secured transversely to the under rear portion of the body, and spiral springs connecting the ends of said transverse spring with the shafts, as and for the purpose herein set forth.

4. In a vehicle, the combination, with the shafts, a spring-actuated frame pivoted in said shafts, and rearwardly-curved brackets rigidly secured to the shafts, of a body suspended from said frame at its forward end, a semi-elliptic spring secured transversely to the under rear portion of the body, and spiral springs connecting the ends of said transverse spring with the brackets, substantially as herein shown and described.

H. K. OLMSTED.

Witnesses:
BISMARK SEVERIN,
G. W. REYNOLDS.